US009480071B2

(12) United States Patent
Krishnamoorthy et al.

(10) Patent No.: US 9,480,071 B2
(45) Date of Patent: Oct. 25, 2016

(54) INTELLIGENT SKIPPING OF INTERFERING FREQUENCY MEASUREMENTS IN UE MEASUREMENT GAPS

(71) Applicant: QUALCOMM Incorporated, San Diego, CA (US)

(72) Inventors: Parthasarathy Krishnamoorthy, Hyderabad (IN); Prashanth Mohan, Chennai (IN); Aravinth Rajendran, Hyderabad (IN); Janga Reddy Alimineti, Hyderabad (IN); Krishnakumar Vasanthasenan, Hyderabad (IN); Anand Rajurkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/566,017

(22) Filed: Dec. 10, 2014

(65) Prior Publication Data

US 2016/0174232 A1    Jun. 16, 2016

(51) Int. Cl.
| | |
|---|---|
| *H04W 36/00* | (2009.01) |
| *H04W 72/08* | (2009.01) |
| *H04B 1/10* | (2006.01) |
| *H04W 24/08* | (2009.01) |

(Continued)

(52) U.S. Cl.
CPC ............ *H04W 72/082* (2013.01); *H04B 1/10* (2013.01); *H04B 1/1027* (2013.01); *H04W 24/08* (2013.01); *H04W 36/24* (2013.01); *H04W 88/06* (2013.01)

(58) Field of Classification Search
CPC ... H04W 36/30; H04W 36/18; H04W 36/14; H04W 36/12; H04W 36/08; H04W 72/082; H04W 24/08; H04W 36/24; H04W 88/06
See application file for complete search history.

(56) References Cited

U.S. PATENT DOCUMENTS

| 5,884,145 A | 3/1999 | Haartsen |
| 5,884,181 A | 3/1999 | Arnold et al. |

(Continued)

FOREIGN PATENT DOCUMENTS

WO    9727680 A1    7/1997

OTHER PUBLICATIONS

International Search Report and Written Opinion—PCT/US2015/057318—ISA/EPO—Jan. 29, 2016.

*Primary Examiner* — Kashif Siddiqui
(74) *Attorney, Agent, or Firm* — The Marbury Law Group, PLLC

(57) ABSTRACT

Various embodiments implemented on a mobile communication device provide methods for skipping power measurements of frequency bands included in a list of frequency bands received from a first subscription's network to conserve power and to increase the likelihood of avoiding a coexistence event between a first subscription and a second subscription. Specifically, a processor of the mobile communication device may order the list of frequency bands such that non-interfering frequency bands are ordered before interfering frequency bands. The processor may then take power measurements of frequency bands in the list, in order, until the processor determines that a power measurement has satisfied a minimum power threshold. In response to such a determination, the device processor may report the power measurement that satisfies the minimum power threshold to the first subscription's network and may not take any more power measurements of the remaining frequency bands in the list.

28 Claims, 9 Drawing Sheets

(51) Int. Cl.
  *H04W 36/24* (2009.01)
  *H04W 88/06* (2009.01)

(56) References Cited

U.S. PATENT DOCUMENTS

| | | | |
|---|---|---|---|
| 6,973,059 B1 | 12/2005 | Borst et al. | |
| 8,737,924 B2 | 5/2014 | Fu et al. | |
| 2008/0293394 A1* | 11/2008 | Silver | H04M 3/42238 455/417 |
| 2012/0176923 A1* | 7/2012 | Hsu | H04W 52/243 370/252 |
| 2012/0207040 A1 | 8/2012 | Comsa et al. | |
| 2013/0012135 A1* | 1/2013 | Ruohonen | H04B 1/406 455/63.1 |
| 2013/0029704 A1* | 1/2013 | Koo | H04W 72/1215 455/501 |
| 2013/0303235 A1* | 11/2013 | Zheng | H04W 88/06 455/552.1 |
| 2013/0329639 A1* | 12/2013 | Wietfeldt | H04W 88/06 370/328 |
| 2014/0031031 A1 | 1/2014 | Gauvreau et al. | |
| 2014/0087664 A1* | 3/2014 | Majjigi | H04W 52/52 455/41.2 |
| 2014/0155119 A1* | 6/2014 | Bishop | H04W 52/36 455/552.1 |
| 2014/0213210 A1 | 7/2014 | Li et al. | |

* cited by examiner

500

| SUBSCRIPTIONS | AVAILABLE FREQUENCY BANDS |
|---|---|
| Subscription$_1$ | A, B, C |
| Subscription$_2$ | X, Y |

| FREQUENCY BAND | INTERFERING FREQUENCY BAND | AMOUNT/DEGREE OF INTERFERENCE |
|---|---|---|
| A | X | S |
| A | W | T |
| B | Y | U |
| C | Z | V |

| FREQUENCY BAND | INTERFERING FREQUENCY BAND | AMOUNT/DEGREE OF INTERFERENCE |
|---|---|---|
| C | Z | V |
| A | W | T |
| A | X | S |
| B | Y | U |

FIG. 5C

INTELLIGENT SKIPPING OF INTERFERING FREQUENCY MEASUREMENTS IN UE MEASUREMENT GAPS

BACKGROUND

Some new designs of mobile communication devices include two or more Subscriber Identity Module ("SIM") cards that provide users with access to multiple separate mobile telephony networks. Examples of mobile telephony networks include GSM, TD-SCDMA, CDMA2000, LTE, and WCDMA. Example multi-SIM mobile communication devices include mobile phones, laptop computers, smart phones, and other mobile communication devices that are configured to connect to multiple mobile telephony networks. A mobile communication device that includes a plurality of SIMs and connects to two or more separate mobile telephony networks using two or more separate radio-frequency ("RF") transceivers is termed a "multi-SIM-multi-active" communication device. An example of a multi-SIM-multi-active communication device is a "dual-SIM-dual-active" communication device that includes two SIM cards/subscriptions associated with two mobile telephony networks.

When a mobile communication device includes a plurality of subscriptions, each subscription on the device may utilize a different RF resource to communicate with the subscription's associated network at any time. For example, a first subscription (e.g., a subscription to a GSM network) may use a first transceiver to transmit to a GSM base station at the same time a second subscription (e.g., a subscription to a WCDMA network) uses a second transceiver to transmit to a WCDMA base station. However, in certain frequency-band combinations of operation, the simultaneous use of the RF resources may cause one or more RF resources to desensitize or interfere with the ability of the other RF resources to operate normally because of the proximity of the antennas of the RF chains included in the multi-SIM-multi-active communication device.

Generally, receiver desensitization (sometimes referred to as "de-sense"), or degradation of receiver sensitivity, may result from noise interference of a nearby transmitter. For example, when two radios are close together with one transmitting on the uplink—sometimes referred to as the aggressor communication activity ("aggressor")—and the other receiving on the downlink—sometimes referred to as the victim communication activity ("victim")—signals from the aggressor's transmitter may be picked up by the victim's receiver or otherwise interfere with reception of a weaker signal (e.g., from a distant base station). As a result, the received signals may become corrupted and difficult or impossible for the victim to decode. Receiver de-sense presents a design and operational challenge for multi-radio devices, such as multi-SIM-multi-active communication devices, due to the necessary proximity of transmitter and receiver.

SUMMARY

The various embodiments include methods that may be implemented on a multi-subscription mobile communication device for avoiding an identifying interfering frequency bands coexistence event between a first subscription and a second subscription. Methods according to various embodiments may include determining an amount of interference that frequency bands in a list of frequency bands available to the first subscription would impose on frequency bands used by the second subscription, ordering the list of frequency bands in order of increasing interference with frequency bands used by the second subscription, taking power measurements of frequency bands in the ordered list in order, determining whether a power measurement for a frequency band satisfies a minimum power threshold, suspending further measurements of frequency bands in the ordered list in response to determining that the power measurement for a frequency band satisfies the minimum power threshold. The power measurement that satisfies the minimum power threshold may be reported to the network of the first subscription according to standard protocols. In some embodiments, determining an amount of interference that frequency bands in a list of frequency bands available to the first subscription would impose on frequency bands used by the second subscription may include determining an amount of coexistence interference that each frequency band in the list of frequency bands would impose on a frequency band used by the second subscription.

In some embodiments, the methods may include identifying frequency bands in the list of frequency bands available to the first subscription that will interfere ("interfering frequency bands") with frequency bands used by the second subscription by an amount of coexistence interference that equals or exceeds a maximum interference threshold. In some embodiments, the methods may further include identifying frequency bands in the list of frequency bands available to the first subscription that will not interfere ("non-interfering frequency bands") with frequency bands used by the second subscription, in which ordering the list of frequency bands in order of increasing interference with frequency bands used by the second subscription includes ordering the list of frequency bands such that non-interfering frequency bands are ordered before interfering frequency bands.

In some embodiments the method may further include performing a handover operation in the first subscription to the frequency band that satisfies the minimum power threshold in response to instructions received from the network of the first subscription. In some embodiments the method may further include receiving the list of frequency bands from the network of the first subscription. In some embodiments the method may further include monitoring for a coexistence event between the first subscription and the second subscription, and performing the operations of the method in response to detecting that a coexistence event has started or is scheduled to start.

In some embodiments, ordering the list of frequency bands in order of increasing interference with frequency bands used by the second subscription may involve generating an ordered index of the list of frequency bands, or adding a ranking value to entries in the list of frequency bands that a processor can use to select frequency bands for power measurements in order of increasing interference.

Various embodiments include a method implemented on a multi-subscription mobile communication device to manage a coexistence event between a first subscription and a second subscription by identifying frequency bands in a list of frequency bands available to the first subscription that will not interfere ("non-interfering frequency bands") with frequency bands used by the second subscription, taking power measurements of non-interfering frequency bands until a power measurement of a non-interfering frequency band satisfies a minimum power threshold, suspending further power measurements of remaining non-interfering frequency bands in response to determining that a power measurement for a non-interfering frequency band satisfies the minimum power threshold, and reporting the power measurement that satisfies the minimum power threshold to the network of the first subscription. In some embodiments, if all non-interfering frequency bands have been measured and none of the power measurement that satisfies the minimum power threshold, the method may further include determining an amount of coexistence interference associated with frequency bands in the list of frequency bands available to the first subscription that will interfere ("interfering frequency bands") with frequency bands used by the second subscription, taking power measurements of the interfering frequency bands in order of coexistence interference based on the determined amounts of coexistence interference, and in response to determining that a power measurement for an interfering frequency band satisfies the minimum power threshold, suspending further power measurements of remaining frequency bands and reporting the power measurement that satisfies the minimum power threshold to the network of the first subscription.

Various embodiments may include a mobile communication device configured with processor-executable instructions to perform operations of the methods described above.

Various embodiments may include a mobile communication device having means for performing functions of the operations of the methods described above.

Various embodiments may include non-transitory processor-readable media on which are stored processor-executable instructions configured to cause a processor of a mobile communication device to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 5A-5C are example data tables including information regarding available and interfering frequency bands for a plurality of subscriptions operating on a multi-SIM-multi-active communication device according to various embodiments.

DETAILED DESCRIPTION

Figure 1:
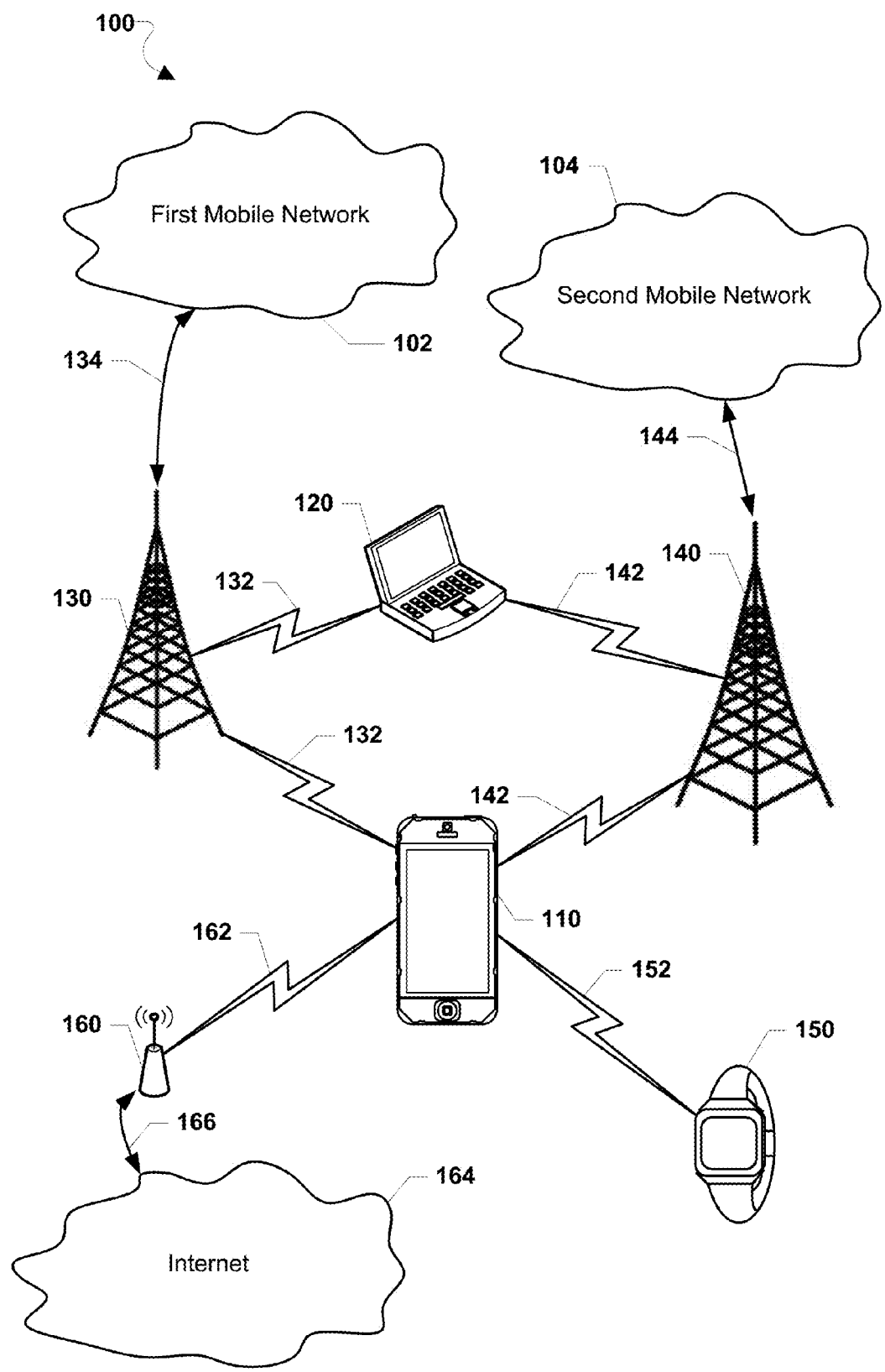
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "multi-SIM-multi-active communication device" and "mobile communication device" are used interchangeably and refer to any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices that include a programmable processor, memory, and circuitry for connecting to at least two mobile communication networks. The various aspects may be useful in mobile communication devices, such as smart phones, and so such devices are referred to in the descriptions of various embodiments. However, the embodiments may be useful in any electronic devices, such as a dual-SIM-dual-active communication device, that may individually maintain a plurality of subscriptions that may simultaneously utilize a plurality of separate RF resources.

As used herein, the terms "SIM", "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "subscription" is also used herein as a shorthand reference to the communication service associated with and enabled by the information stored in a particular SIM as the SIM and the communication network, as well as the services and subscriptions supported by that network, correlate to one another.

As described, because a multi-SIM-multi-active communication device has a plurality of separate RF resources/radios, each subscription on the multi-SIM-multi-active communication device may use the subscription's associated RF resource to communicate with the subscription's mobile network at any time. As a result, in certain frequency-band combinations of operation, the simultaneous use of the RF resources may cause one or more RF resources to desensitize or interfere with the ability of the other RF resources to operate normally because of the proximity of the antennas of the RF chains included in the multi-SIM-multi-active communication device.

For example, a dual-SIM-dual-active communication device may suffer from intra-device interference when an aggressor subscription is attempting to transmit while a victim subscription in the dual-SIM-dual-active communication device is simultaneously attempting to receive transmissions. During such a "coexistence event," the aggressor subscription's transmissions may impair the victim subscription's ability to receive transmissions. This interference may be in the form of blocking interference, harmonics, intermodulation, and other noises and distortion received by the victim subscription. Such interference may significantly degrade the victim's receiver sensitivity, page receptions, and Short Message Service (SMS) reception. These effects may also result in a reduced network capacity of the multi-SIM-multi-active communication device.

Currently, several solutions are implemented on conventional multi-SIM-multi-active communication devices to mitigate victim subscription de-sense. In some solutions, a multi-SIM-multi-active communication device configures the aggressor subscription to reduce or zero the multi-SIM-multi-active communication device's transmit power while the victim subscription is receiving transmissions (sometimes referred to as implementing transmit ("Tx") blanking) in order to reduce or eliminate the victim subscription's de-sense. While such current solutions are effective at reducing de-sense of the victim subscription's receiving operations, the improvement to the victim subscription's reception performance is often at the expense of the aggressor subscription's performance. Current solutions that utilize Tx blanking incur a cost on the link-level performance of the aggressor subscription and/or impact the aggressor subscription's uplink throughput because the total amount of data the aggressor subscription is able to send to the network is diminished because some transmissions are lost (i.e., "blanked") due to low or zeroed transmit power. Specifically, by implementing Tx blanking, some (or all) of the information included in the data blocks sent via the aggressor subscription to the network may be lost, increasing the error rate (e.g., the block error rate or "BLER") and dropped packets in data streams transmitted to the network of the aggressor subscription.

Typically, multiple frequency bands may be available to a subscription operating on a multi-SIM-multi-active communication device. Thus, other conventional solutions leverage a subscription's access to multiple frequency bands to avoid coexistence interference by configuring the subscription to receive service from a frequency band that does not interfere with other frequency bands. However, current solutions either involve directly notifying the network of a subscription's interfering bands—requiring additional signaling and communications between the multi-SIM-multi-active communication device and the network—or removing the subscription's interfering frequency bands from a list of bands reported to the network, which may limit the multi-SIM-multi-active communication device's overall communication capabilities.

Currently, a subscription's network (e.g., via a cell or base station) periodically sends a mobile communication device a list of frequency bands—for example, via an Radio Resource Control (RRC) Connection Reconfiguration message—to the mobile communication device. The mobile communication device takes power measurements of the listed frequency bands during "measurement gaps" and reports those measurements back to the network. The network typically uses these measurements to determine whether the subscription should perform a handover operation to another, better cell (e.g., a cell with a higher signal strength), and select the cell to take over the call or connection when a handover operation is appropriate.

The frequency bands included in the list received from a first subscription's network may include both frequency bands that will exhibit coexistence interference with a frequency band of a second subscription (i.e., sometimes referred to herein as an "interfering frequency band") and frequency bands that will not exhibit coexistence interference with a frequency band of the second subscription (sometimes referred to herein as a "non-interfering frequency band"). In conventional implementations, the mobile communication device measures and reports power measurements of each frequency band in the list received from the network, regardless of whether any of those frequency bands are interfering frequency bands. Consequently, conventional mobile communication devices often expend power taking measurements of interfering frequency bands even though measurements of interfering frequency bands are typically spurious and unreliable due to coexistence interference. Even if a mobile communication device measures an interfering frequency band and reports the results to the network, conventional mobile communication devices may prevent or inhibit a subscription from moving to the interfering frequency band. Thus, measuring and reporting measurements for known interfering frequency bands may consume device resources (e.g., power and time) with no practical benefit to device performance or network operations.

In overview, various embodiments implemented on a mobile communication device (e.g., a multi-SIM-multi-active communication device) provide methods for intelligently skipping power measurements of interfering frequency bands included in a list of frequency bands received from a first subscription's network in order to conserve power and to increase the likelihood of avoiding a coexistence event between a first subscription and a second subscription. Specifically, in various embodiments, a processor of the mobile communication device may order the list of frequency bands such that non-interfering frequency bands in the list are selected for measurement before interfering frequency bands in the list. The processor may then take power measurements of the frequency bands in the list in order until the processor determines that a power measurement satisfies (i.e., is greater than or equal to) a minimum power threshold that may be associated with a desired quality of service. In response to making such a determination, the device processor may report the frequency power measurement that satisfies the minimum power threshold to the first subscription's network and may not take any more power measurements nor send reports for the remaining frequency bands in the list. Thus, non-interfering frequency bands are measured first by the mobile communication device, and measurements cease once an acceptable (i.e., better than the threshold) frequency band is identified. If an acceptable non-interfering band is identified by the mobile communication device, the first subscription's network will only receive measurements for non-interfering bands (including the acceptable band), and therefore will evaluate and direct the need for handover operations based solely on non-interfering bands. Consequently, the first subscription's network will not direct a handover to an interfering frequency band.

The various embodiments enable the device processor to conserve power by taking only as many power measurements as necessary to find and report a power measurement that satisfies the minimum power threshold. Further, by ordering the list of frequency bands received from the first subscription's network from non-interfering frequency bands to interfering frequency bands, the device processor increases the likelihood of finding and reporting a power measurement of a non-interfering frequency band that satisfies the minimum power threshold. Consequently, the mobile communication device may avoid expending device resources (e.g., power and transceiver time) taking power measurements of interfering frequencies in the list of frequency bands.

In some embodiments, the device processor may identify the frequency bands in the list that interfere with a second subscription's frequency bands based on predetermined information stored on or received by the mobile communication device. For example, the device processor may perform a lookup operation in a frequency-band-interference table to identify the frequency bands in the list that are associated with coexistence interference that involves a frequency band of the second subscription (see, e.g., FIGS. 5A-5B). In some embodiments, the information stored in such data tables may be static (e.g., preloaded on the mobile communication device) or dynamic (e.g., continually updated by new information received on the mobile communication device, such as from a network).

In some embodiments, in response to identifying one or more interfering frequency bands in the list of frequency bands, the device processor may order/rank/prioritize the frequency bands in the list such that non-interfering frequencies are ordered before the interfering frequencies included in the list. For example, the device processor may divide the frequency bands in the list into a group of non-interfering frequency bands and a group of interfering frequency bands. In such embodiments, the device processor may take power measurements for the non-interfering bands, one at a time, until the device processor finds a power measurement that satisfies the minimum power threshold. As soon as the device processor identifies a power measurement of a non-interfering frequency band that satisfies the minimum power threshold, the device processor may stop taking power measurements (i.e., may skip measuring the signal powers of any other frequency band in the list) and may report the power measurement that satisfies the minimum power threshold to the first subscription's network.

In the event that no non-interfering frequency band associated with a power measurement satisfies the minimum power threshold, the device processor may begin taking power measurements for the interfering frequency bands, one at a time, until the device processor identifies a power measurement that satisfies the minimum power threshold. In circumstances, the device processor may similarly stop taking power measurements of any other frequency band in the list as soon as the device processor determines that a power measurement of an interfering frequency band satisfies the minimum power threshold, and the device processor may report this power measurement to the network of the first subscription. Thus, even though the device processor may be unable to avoid reporting the power measurement of an interfering frequency band, the device processor may perform fewer power measurements overall, thereby reducing total power consumption.

In some embodiments, the device processor may determine an amount of coexistence interference associated with each frequency band in the list received from the first subscription's network, such as by referencing a frequency-band-interference table as described. Based on these determined amounts of coexistence interference, the device processor may order the frequency bands in the list such that frequency bands associated with less (or no) coexistence interference are ordered before frequency bands associated with more coexistence interference. In such embodiments, the device processor may traverse through the ordered list to find and report the first frequency band that satisfies the minimum power threshold and may not take power measurements for any other frequency bands in the list.

In the normal operation of a mobile communication device, the activities of subscriptions may change during the ordinary course of operating on a mobile communication device, such as when a subscription ceases a transmission cycle and begins a reception cycle or vice versa. Thus, an aggressor subscription at a first time may become a victim subscription at a second time, and the victim subscription at the first time may similarly become an aggressor subscription at a second or third time. Therefore, while various embodiments may occasionally be described with reference to an aggressor subscription and a victim subscription, the subscriptions may be referred to generally as a first subscription and a second subscription to reflect that the subscriptions' roles as an aggressor communication activity or a victim communication activity may change. For example, a first subscription may simultaneously be characterized as both an aggressor subscription in relation to a second subscription and a victim subscription in relation to the second (or a third) subscription. Thus, in such embodiments, the first subscription may be an aggressor subscription and/or a victim subscription without any loss in generality.

While a non-interfering frequency band of the first subscription may be a frequency band that does not interfere with the frequency band of the second subscription, in some embodiments, a non-interfering frequency band may be any frequency band that causes/experiences interference involving a frequency band of a second subscription such that the coexistence interference is below a coexistence interference threshold. For example, a frequency band that is mildly interfering may be deemed acceptable or a "non-interfering" frequency band because the interference associated with the frequency band is below a coexistence interference threshold. Thus, in such embodiments, another frequency band may be deemed an "interfering" frequency band when that frequency band is associated with interference that satisfies (e.g., is equal to or less than) the coexistence interference threshold.

Various embodiments may be implemented within a variety of communication systems 100 that include at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may communicate with the second mobile network 104 through the cellular connection 142 to the second base station 140. The cellular connections 132 and 142 may be made through two-way wireless communication links, such as 4G, 3G, LTE, CDMA, TDMA, WCDMA, GSM, and other mobile telephony communication technologies.

While the mobile communication devices 110, 120 are shown connected to the mobile networks 102, 104, in some embodiments (not shown), the mobile communication devices 110, 120 may include one or more subscriptions to two or more mobile networks 102, 104 and may connect to those networks in a manner similar to operations described above.

The various embodiments may be implemented in a variety of network environments. For example, the first mobile network 102 and second mobile network 104 may be the same mobile network supported by the same network operator, such as different subscriptions (e.g., a work-related subscription and a personal subscription) with the same network provider. As another example, the first mobile network 102 and second mobile network 104 may be different mobile networks supported by different network operators. As a further example, the first mobile network 102 and second mobile network 104 may be different mobile networks supported by different network operators that employ different radio access technologies (e.g., GSM and LTE). Therefore, references to the first and second subscriptions, and first and second networks are not intended to require or imply that the networks be different, nor to imply that either network uses the same or different radio access technologies.

In some embodiments, the first mobile communication device 110 may establish a wireless connection 152 with a peripheral device 150 used in connection with the first mobile communication device 110. For example, the first mobile communication device 110 may communicate over a Bluetooth link with a Bluetooth-enabled personal computing device (e.g., a "smart watch"). In some embodiments, the first mobile communication device 110 may establish a wireless connection 162 with a wireless access point 160, such as over a Wi-Fi connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

Figure 2:
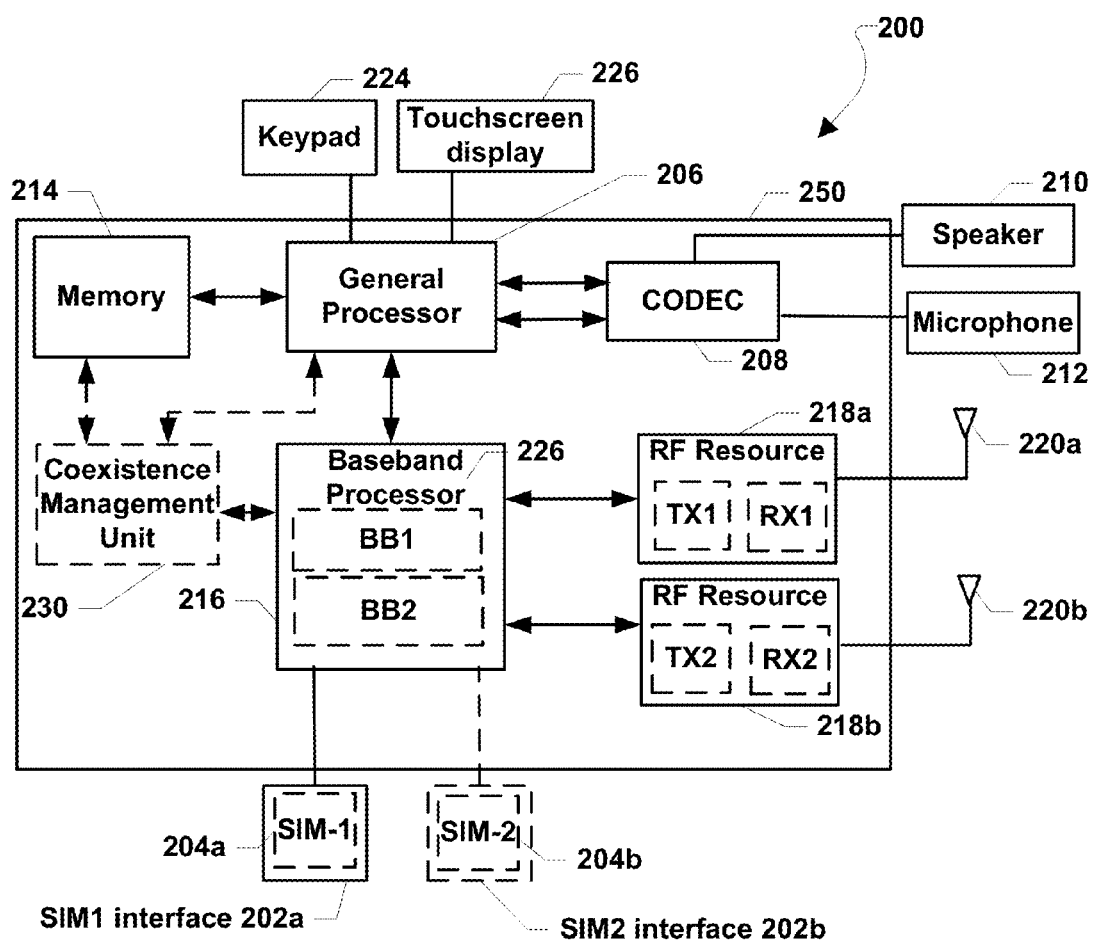
FIG. 2 is a component block diagram of a multi-SIM-multi-active communication device according to various embodiments.

FIG. 2 is a functional block diagram of a mobile communication device 200 suitable for implementing various embodiments. According to various embodiments, the mobile communication device 200 may be similar to one or more of the mobile communication devices 110, 120 as described with reference to FIG. 1. With reference to FIGS. 1-2, the mobile communication device 200 may include a first SIM interface 202a, which may receive a first identity module SIM-1 204a that is associated with a first subscription. The mobile communication device 200 may also include a second SIM interface 202b, which may receive a second identity module SIM-2 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM, and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number is printed on the SIM card for identification. However, a SIM may be implemented within a portion of memory of the mobile communication device 200 (e.g., a memory 214), and thus need not be a separate or removable circuit, chip or card.

The mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure.

The general processor 206 and the memory 214 may each be coupled to at least one baseband modem processor 216. Each SIM in the mobile communication device 200 (e.g., the SIM-1 204a and the SIM-2 204b) may be associated with a baseband-RF resource chain. A baseband-RF resource chain may include the baseband modem processor 216, which may perform baseband/modem functions for communicating with/controlling a RAT, and may include one or more amplifiers and radios, referred to generally herein as RF resources (e.g., RF resources 218a, 218b). In some embodiments, baseband-RF resource chains may share the baseband modem processor 216 (i.e., a single device that performs baseband/modem functions for all SIMs on the mobile communication device 200). In other embodiments, each baseband-RF resource chain may include physically or logically separate baseband processors (e.g., BB1, BB2).

In some embodiments, the RF resources 218a, 218b may be associated with different subscriptions. For example, a first subscription (e.g., a subscription to a GSM network) may be associated with the RF resource 218a, and a second subscription (e.g., a subscription to a CDMA or a WCDMA network) may be associated with the RF resource 218b. The RF resources 218a, 218b may each be transceivers that perform transmit/receive functions on behalf of their respective subscriptions. The RF resources 218a, 218b may also include separate transmit and receive circuitry, or may include a transceiver that combines transmitter and receiver functions. The RF resources 218a, 218b may each be coupled to a wireless antenna (e.g., a first wireless antenna 220a or a second wireless antenna 220b). The RF resources 218a, 218b may also be coupled to the baseband modem processor 216.

In some embodiments, the general processor 206, the memory 214, the baseband processor(s) 216, and the RF resources 218a, 218b may be included in the mobile communication device 200 as a system-on-chip 250. In some embodiments, the first and second SIMs 204a, 204b and their corresponding interfaces 202a, 202b may be external to the system-on-chip 250. Further, various input and output devices may be coupled to components on the system-on-chip 250, such as interfaces or controllers. Example user input components suitable for use in the mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the mobile communication device 200 to enable communication between them, as is known in the art.

Functioning together, the two SIMs 204a, 204b, the baseband modem processor 216, the RF resources 218a, 218b, and the wireless antennas 220a, 220b may constitute two or more radio access technologies (RATs). For example, a SIM, baseband processor and RF resource may be configured to support two different RATs, such as GSM and WCDMA. More RATs may be supported on the mobile communication device 200 by adding more SIM cards, SIM interfaces, RF resources, and/or antennae for connecting to additional mobile networks.

The mobile communication device 200 may include a coexistence management unit 230 configured to manage power measurement reporting for one or more subscriptions on the mobile communication device 200. In some embodiments, the coexistence management unit 230 may be implemented within the general processor 206. In some embodiments, the coexistence management unit 230 may be implemented as a separate hardware component (i.e., separate from the general processor 206). In some embodiments, the coexistence management unit 230 may be implemented as a software application stored within the memory 214 and executed by the general processor 206. The coexistence management unit 230 may selectively report a power measurement for a non-interfering frequency band and may skip taking and reporting power measurements for interfering frequency bands as described in the disclosure.

Figure 3:
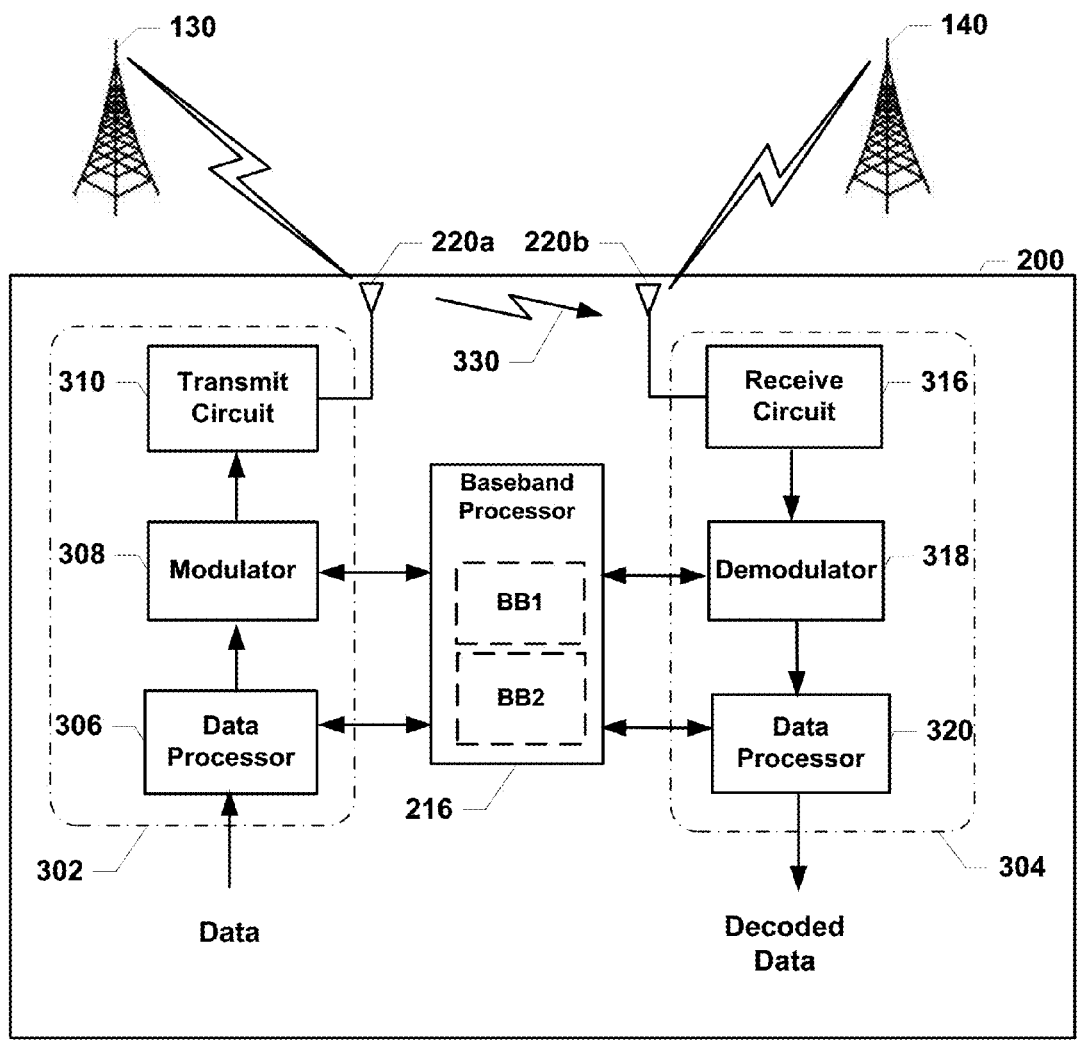
FIG. 3 is a component block diagram illustrating the interaction between components of different transmit/receive chains in a multi-SIM-multi-active communication device according to various embodiments.

FIG. 3 is a block diagram of transmit and receive components in separate RF resources on the mobile communication device 200 described above with reference to FIGS. 1-2, according to various embodiments. With reference to FIGS. 1-3, a transmitter 302 may be part of the RF resource 218a, and a receiver 304 may be part of the RF resource 218b. In some embodiments, the transmitter 302 may include a data processor 306 that may format, encode, and interleave data to be transmitted. The transmitter 302 may include a modulator 308 that modulates a carrier signal with encoded data, such as by performing Gaussian minimum shift keying (GMSK). One or more transmit circuits 310 may condition the modulated signal (e.g., by filtering, amplifying, and upconverting) to generate an RF modulated signal for transmission. The RF modulated signal may be transmitted to the first base station 130 via the first wireless antenna 220a, for example.

At the receiver 304, the second wireless antenna 220b may receive RF modulated signals from the second base station 140 on the second wireless antenna 220b. However, the second wireless antenna 220b may also receive some RF signaling 330 from the transmitter 302, which may ultimately compete with the desired signal received from the second base station 140. One or more receive circuits 316 may condition (e.g., filter, amplify, and downconvert) the received RF modulated signal, digitize the conditioned signal, and provide samples to a demodulator 318. The demodulator 318 may extract the original information-bearing signal from the modulated carrier wave, and may provide the demodulated signal to a data processor 320. The data processor 320 may de-interleave and decode the signal to obtain the original, decoded data, and may provide decoded data to other components in the mobile communication device 200. Operations of the transmitter 302 and the receiver 304 may be controlled by a processor, such as the baseband modem processor 216. In various embodiments, each of the transmitter 302 and the receiver 304 may be implemented as circuitry that may be separated from their corresponding receive and transmit circuitries (not shown). Alternatively, the transmitter 302 and the receiver 304 may be respectively combined with corresponding receive circuitry and transmit circuitry, for example, as transceivers associated with the SIM-1 204a and the SIM-2 204b.

Receiver de-sense may occur when transmissions by a first subscription on the uplink (e.g., the RF signaling 330) interferes with receive activity on a different transmit/receive chain associated with a second subscription. The signals received by the second subscription may become corrupted and difficult or impossible to decode as a result of the de-sense or interference. Further, noise from the transmitter 302 may be detected by a power monitor (not shown) that measures the signal strength of surrounding cells, which may cause the mobile communication device 200 to falsely determine the presence of a nearby cell site.

Because inter-device coexistence interference may severely degrade the performance of subscriptions affected by such interference, various embodiments predict and avoid inter-device coexistence interference by determining whether there is a likelihood of a coexistence event occurring between two (or more) subscriptions and attempting to configure a first subscription to acquire service with a non-interfering frequency band while using less power than used in conventional implementations.

Figure 4:
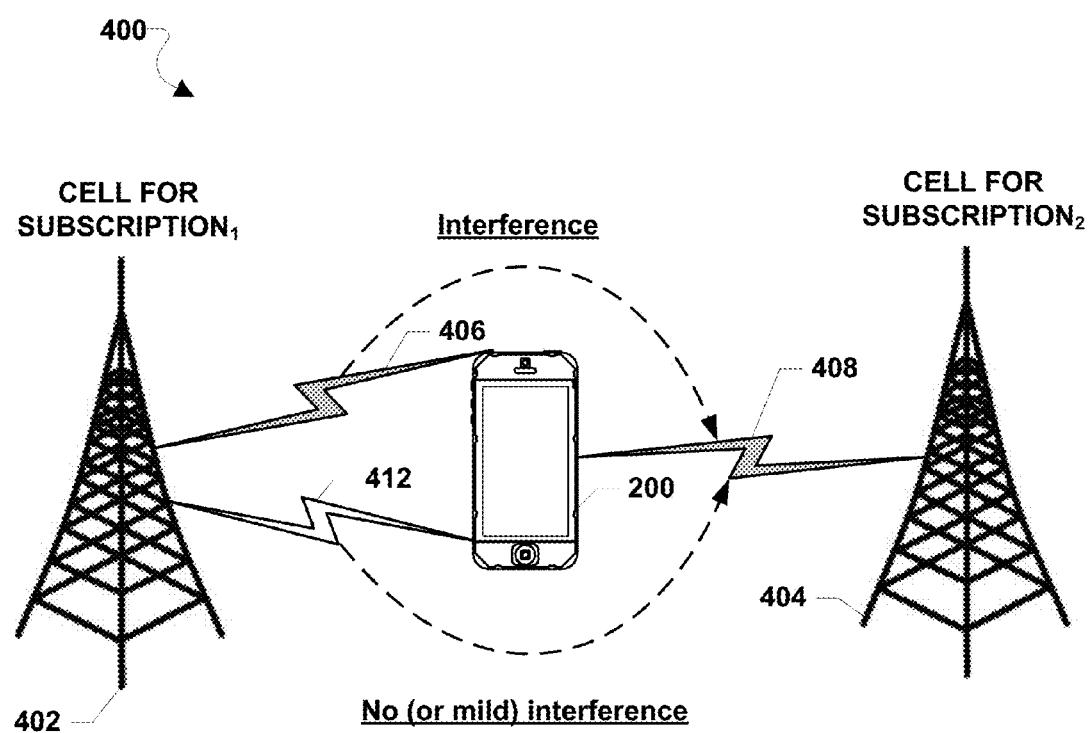
FIG. 4 is a communication system block diagram illustrating an example of coexistence interference between a frequency band of an aggressor subscription and a frequency band of a victim subscription according to various embodiments.

FIG. 4 illustrates a communication system 400 in which a coexistence event is occurring between a first subscription and a second subscription on a mobile communication device (e.g., the mobile communication device 200 of FIGS. 2-3).

With reference to FIGS. 1-4, as described, coexistence interference between two frequency bands may occur on the mobile communication device 200 when transmissions sent via a frequency band 406 of the first subscription interferes with the ability of a second subscription to receive communications from the cell 404 via a frequency band 408 (or vice versa). For example, the signals received via the frequency band 408 for the second subscription may become corrupted and difficult or impossible to decode as a result of de-sense or interference caused by the frequency band 406.

Thus, because coexistence interference between the frequency band 406 of the first subscription and the frequency band 408 of the second subscription may severely degrade the performance of the second subscription, the mobile communication device 200 may attempt to avoid such coexistence interference by causing the first subscription to move to another frequency band that does not interfere with the frequency band 408 or that interferes with the frequency band 408 less than the frequency band 406. In some embodiments, the mobile communication device 200 may attempt to avoid the coexistence event between the first subscription and the second subscription by selectively reporting power measurements for non-interfering frequency bands included in a list of frequency bands received from the first subscription's network, as described.

For example, in the illustrated communication system 400, the mobile communication device 200 may receive a list of frequency bands from the first subscription's network (e.g., via the cell 402) that includes the interfering frequency band 406 and the non-interfering frequency band 412. In response to determining that a coexistence event is occurring or will occur between the first subscription and the second subscription, the mobile communication device 200 may order the list of frequency bands such that the non-interfering frequency band 412 is ordered before the interfering frequency band 406.

Because the non-interfering frequency band 412 is ordered before the interfering frequency band 406, the mobile communication device 200 may initially take a power measurement for the non-interfering frequency band 412 and may determine whether the power measurement of the non-interfering frequency band 412 satisfies a minimum power threshold. In response to determining that the power measurement of the non-interfering frequency band 412 satisfies the minimum power threshold, the mobile communication device 200 may report that power measurement and may skip taking and reporting a power measurement for the interfering frequency band 406. However, in response to determining that the power measurement of the non-interfering frequency band 412 does not satisfy the minimum power threshold, the mobile communication device 200 may take and report a power measurement for the interfering frequency band 406.

Thus, the mobile communication device 200 may have an increased likelihood that the first subscription's network will instruct the first subscription to move to the non-interfering frequency band 412 by reporting the power measurement of the non-interfering frequency band 412. Further, the mobile communication device 200 may experience power savings by not taking and reporting a power measurement for frequency bands that are ordered after the non-interfering frequency band 412 (e.g., the interfering frequency band 406) in situations in which the power measurement of the non-interfering frequency band 412 satisfies the minimum power threshold.

FIGS. 5A-5B illustrate example data tables 500,525 that a mobile communication device (e.g., the mobile communication device 200 described with reference to FIGS. 2-4) may reference to order a list of frequency bands received from a first subscription's network based on coexistence interference.

With reference to FIGS. 1-5B, a processor of a mobile communication device (e.g., the general processor 206, the baseband modem processor 216, the coexistence management unit 230, a separate controller, and/or the like) may utilize the information included in one or more data tables to identify the frequency bands in a list of frequency bands received from the first subscription's network that are associated with coexistence interference that involves a frequency band available to the second subscription.

For example, the device processor may receive a list of frequency bands from the first subscription's network that include frequency bands "A," "B," and "C." In response, the device processor may reference a data table 500 that includes information regarding the frequency bands currently available to the subscriptions of on the mobile communication device to determine that frequency bands "X" and "Y" are currently available to the second subscription (labeled in FIG. 5A as "Subscription").

The device processor may also reference a frequency-band-interference table 525 that includes information regarding frequency bands that interfere with other frequency bands to identify the frequency bands in the list that interfere (and that do not interfere) with the frequency bands available to the second subscription. In the above example, the device processor may reference the frequency-band-interference table 525 to determine that frequency band "A" in the list will interfere with the second subscription's frequency bands "X" and "W," that frequency band "B" in the list will interfere with the second subscription's frequency band "Y," and that the frequency band "Z" in the list will not interfere with any of the second subscription's available frequency bands. Based on this lookup in the frequency-band-interference table 525, the device processor may order the list of frequency bands such that the frequency band "C" (which does not interfere with either of the second subscription's frequency bands "X" and "Y") is ordered before the frequency bands "A" and "B" (which interfere with the second subscription's frequency bands "X" and "Y"). Thus, with respect to the second subscription, frequency band "C" is referred to as a non-interfering frequency band (even though frequency band "C" would interfere with frequency band "Z"), and frequency bands "A" and "B" are referred to as interfering frequency bands.

As described, in some embodiments, the device processor may order the frequency bands in the list received from the first subscription based on an amount of coexistence interference associated with each frequency band in the list. In such embodiments, the device processor may determine the amount of coexistence interference associated with each frequency band in the list via a table-lookup operation. Continuing with the above example, the device processor may perform a table-lookup operation in the frequency-band-interference table 525 to determine that the interfering frequency band "A" experiences an amount of interference "S" associated with the second subscription's frequency band "X," that the interfering frequency band "B" experiences an amount of interference "U" associated with the second subscription's frequency band "Y," and that the non-interfering frequency band "C" does not experience any coexistence interference associated with the frequency bands "X" and "Y" associated with the second subscription. (Frequency band C would exhibit an amount of interference "V" with frequency band "Z;" however, that frequency band is not in use by the second subscription and therefore is of no concern in the example circumstance.) Further, the device processor may determine that the amount of interference "S" is less than the amount of interference "U." While frequency band "A" would exhibit an amount of interference "T" with frequency band "W" if frequency band "W" were in use, that potential interference is of no concern in the example circumstance of the second subscription using frequency bands "X" and "Z."

FIG. 5C illustrates an example of a reordered frequency-band-interference table 530 in which the frequency bands "A," "B," and "C" are organized in order of the degree of interference those frequency bands pose to frequency bands "X" and "Y" that are in use by the second subscription in the illustrated example. Specifically, the reordered frequency-band-interference table 530 lists frequency band "C" first because it does not interfere with either of frequency bands "X" and "Y" (and thus is a non-interfering frequency band with respect to the second subscription). This listing of frequency band "C" first does not depend upon the amount of interference "V" that would be imposed on frequency band Z because frequency band Z is not currently in use (i.e., the amount of interference "V" could be greater than the amounts of interference "S," "T" and "U"). The interfering frequency bands "A" and "B" may be ordered in the reordered frequency-band-interference table 530 based upon the amount of interference "S" and "U" imposed on frequency bands "X" and "Y," respectively. Thus, in the example circumstance of the amount of interference "S" imposed on frequency band "X" by frequency band "A" is less than the amount of interference "U" imposed on frequency band "Y" by frequency band "B," the reordered frequency-band-interference table 530 illustrated in FIG. 5C lists frequency band "A" before frequency band "B." Note that this ordering of frequency band "A" before frequency band "B" is not affected by the amount of interference "T" that would be imposed on frequency band "W," because frequency band "W" is not available to the second subscription.

Thus, based on the interference information included in the frequency-band-interference table 525, the device processor may order the list of frequency bands based on amounts of coexistence interference such that the non-interference frequency band "C" is ordered first, followed by the interfering frequency bands "A" and "B," respectively.

It should be noted that the example ordering of frequency bands and references to frequency band "C" being non-interfering and frequency bands "A" and "B" being interfering are limited to the circumstance of the second subscription using frequency bands "X" and "Y." When the second subscription hands over to new cellular base stations resulting in a shift of available frequency bands, such as when the mobile communication device is moving in a vehicle, the interfering and non-interfering frequency bands may change. For example, as a result of moving to a new cell zone, the second subscription might begin using either of frequency bands "W" and "Z," in which case frequency band "B" would become a non-interfering frequency band and frequency band "C" would become an interfering frequency band. Similarly, frequency band "A" would remain an interfering frequency band because of the interference imposed on frequency band "W," even though the second subscription is no longer using frequency band "X." Further, if the amount of interference "V" imposed by frequency band "C" on frequency band "Z" is greater than the amount of interference "T" imposed by frequency band "A" on frequency band "W," frequency band "C" would be ranked lowest on the list of frequency bands available to the first subscription, while frequency band "B" would be ranked highest. Thus, the designation of interfering or non-interfering frequency bands, and the relative ordering of the frequency bands based on the amount of interference may be dynamic, changing whenever the frequency bands available to the second subscription change.

In some embodiments, two frequency bands may interfere with each other in the event that they are the same, overlap, adjacent, and/or otherwise have characteristics (e.g., be harmonics or sub-harmonics thereof) known to cause interference with each other. Such interference can be determined in advance by a manufacturer of the mobile communication device, a manufacturer of the modems, network operators, and independent parties (e.g., protocol organization, independent testing labs, etc.). Thus, the frequency-band-interference table 525 may be predefined and loaded in memory of the mobile communication device, within one or more of the SIMs, or within a modem within the device. In some embodiments the mobile communication device may be configured to generate a frequency-band-interference data table (e.g., the frequency-band-interference table 525) by recognizing when de-sense is occurring and recording the frequency bands in use at the time by each of the subscriptions.

In various embodiments, a data table (e.g., the data tables 500, 525) may be organized according to a variety of data structures or formats, such as an associative list, a database, a linked list, etc. For example, the frequency-band-interference table 525 is a simple data table in which a frequency band may be used as a look-up data field to determine the frequency bands that will interfere with that frequency band.

While the mobile communication device may reference one or more data tables, such as those described above, to identify interfering or potentially interfering frequency bands for the first subscription, in some embodiments, the device processor may monitor the subscriptions' frequency bands and calculate/detect de-sense associated with the subscriptions' frequency bands as it occurs. In other words, the device processor may identify and/or calculate the interference experience by or caused by one or more of the subscriptions' frequency bands in real time and may order frequency bands in a list of frequency bands received from the first subscription based on those real-time calculations.

Figure 6:
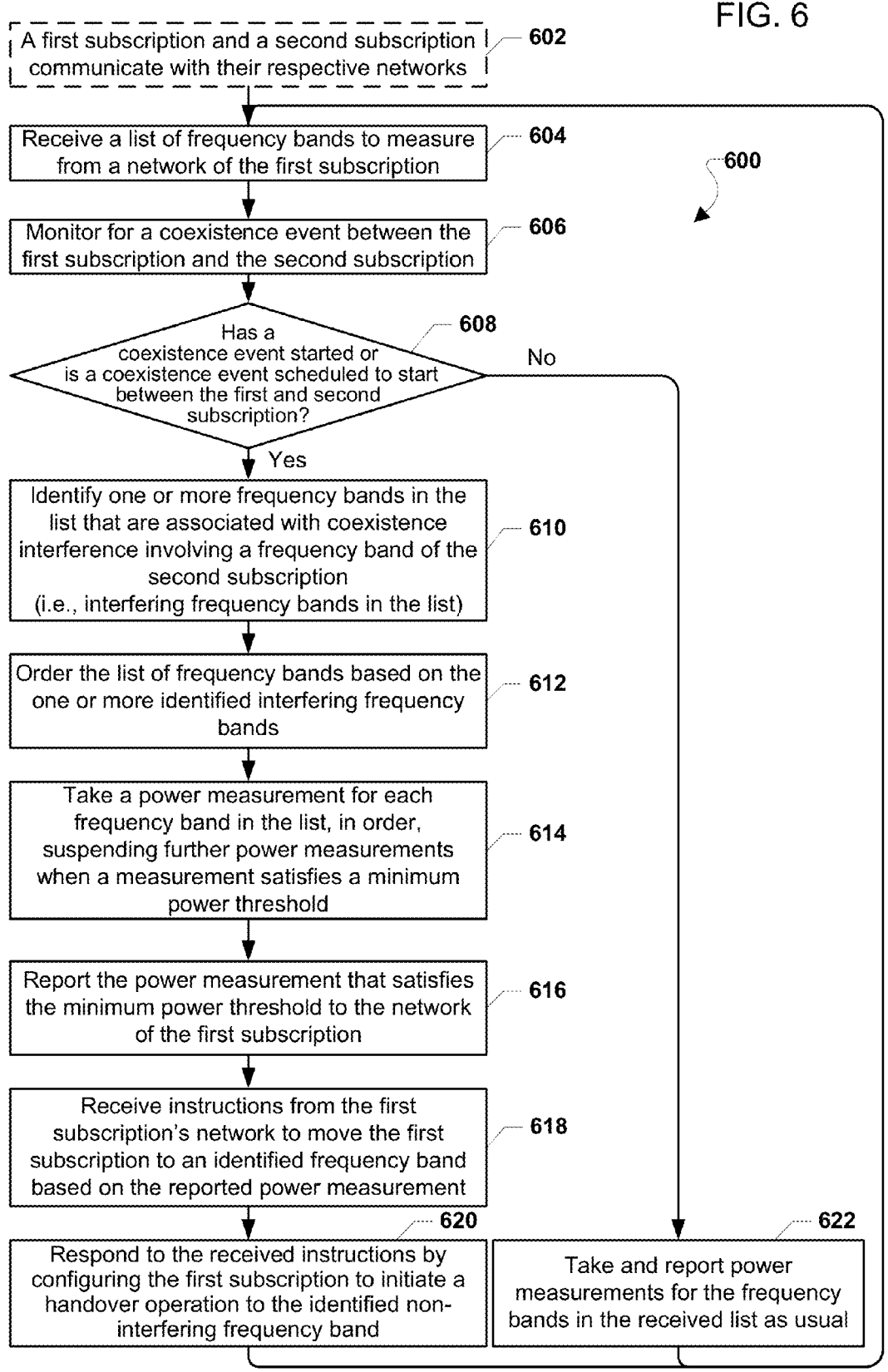
FIG. 6 is a process flow diagram illustrating a method for reporting a power measurement for a frequency band in an ordered list of frequency bands to a network of a first subscription of a mobile communication device according to various embodiments.

FIG. 6 illustrates a method 600 for selectively reporting a power measurement of a non-interfering band of a first subscription to a network of the first subscription according to some embodiments. The method 600 may be implemented with a processor (e.g., the general processor 206 of FIG. 2, the baseband modem processor 216, the coexistence management unit 230, a separate controller, and/or the like) of a multi-SIM-multi-active communication device (e.g., the mobile communication device 200 described with reference to FIGS. 2-4).

With reference to FIGS. 1-6, the device processor may begin performing operations of the method 600 when a first subscription and the second subscription of the mobile communication device are communicating with their respective networks (see block 602). As described, the first and second subscriptions may be communicating with the same network or different networks, and may be using the same radio access technology or different radio access technologies. In block 604, the device processor may receive a list of frequency bands to measure from a network of the first subscription. For example, the device processor may receive an RRC Connection Reconfiguration message from the first subscription's network that includes a list of two or more frequency bands.

In block 606, the device processor may monitor for a coexistence event between the first subscription and the second subscription, such as by frequency bands that are available (or currently utilized by) the first subscription and the second subscription. For example, the device processor may reference a data table that includes information regarding the first and second subscriptions' available frequency bands (e.g., the data table 500).

In determination block 608, the device processor may determine whether a coexistence event has started or is scheduled to start between the first subscription and the second subscription. In some embodiments of the operations performed in determination block 608, the device processor may perform a table-lookup operation in a frequency-band-interference table (e.g., the frequency-band-interference tables 525) to anticipate/determine whether a frequency band of the first subscription is interfering or will interfere with a frequency band of the second subscription.

In response to determining that a coexistence event between the first subscription and the second subscription has not started and is not scheduled to start (i.e., determination block 608="No"), the device processor may take and report power measurements for the frequency bands in the received list of frequency bands as usual in block 622, such as by performing known methods/operations. For example, the device processor may take a power measurement for each frequency band included in the list received in block 604 and may report each of these power measurements to the first subscription's network using standard messaging.

In response to determining that a coexistence event has started or is scheduled to start between the first subscription and the second subscription (i.e., determination block 608="Yes"), the device processor may identify one or more frequency bands in the list that are associated with coexistence interference involving a frequency band of the second subscription, in block 610. In other words, the device processor may identify frequency bands in the list that de-sense and/or are de-sensed by frequency bands of the second subscription. In some embodiments of the operations performed in block 610, the device processor may identify the interfering frequency bands in the list received in block 604 by performing a table-lookup operation in a frequency-band-interference data table similar to the table-lookup operation described with reference to determination block 608.

Figure 7A:
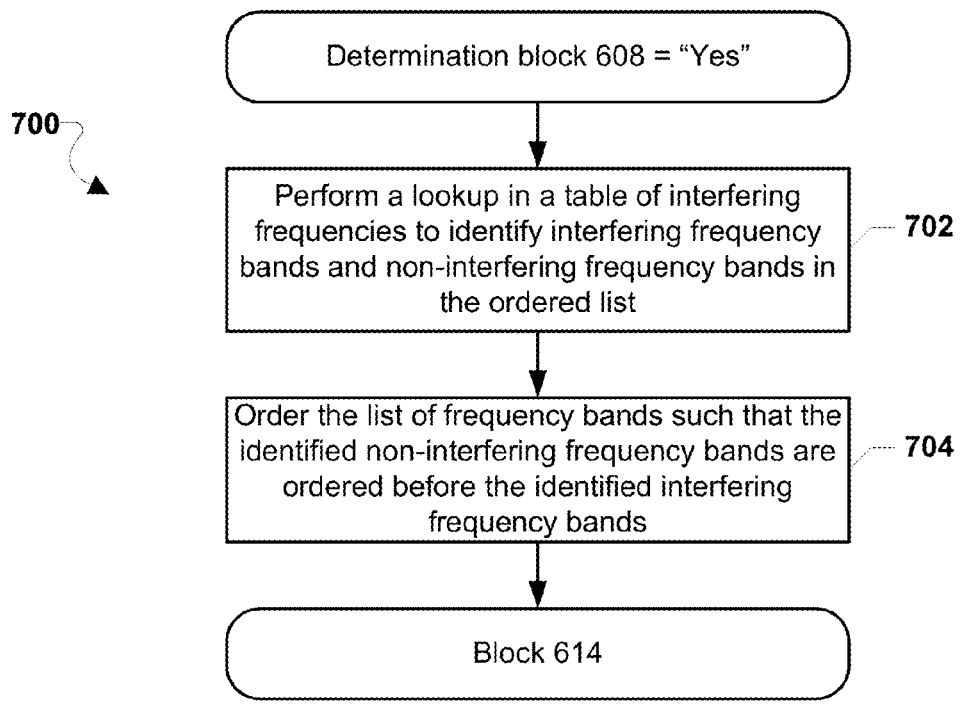
FIG. 7A is a process flow diagram illustrating a method for ordering a list of frequency bands from non-interfering bands to interfering bands according to various embodiments.

In block 612, the device processor may order the list of frequency bands based on the one or more interfering frequency bands identified in block 610, such as by ordering non-interfering frequency bands in the list before interfering frequency bands in the list (see, e.g., FIG. 7A). In some embodiments of the operations performed in block 612, the device processor may order the frequency bands in the list based on the amount of coexistence interference associated with each of the frequency bands in the list (e.g., from the least interference to the most interference) (see, e.g., FIG. 7B).

In block 614, the device processor may take a power measurement for each frequency band in the list, in order, and suspend further power measurements as soon as one of the frequency bands satisfies (e.g., is greater than or equal to) a minimum power threshold. In particular, the device processor may take a power measurement for each frequency band in the ordered list, one at a time, until the device processor identifies a power measurement that satisfies the minimum power threshold. For example, the device processor may start by taking a power measurement for the first frequency band in the ordered list. In response to determining that the power measurement of the first-ordered frequency band does not satisfy the minimum power threshold, the device processor may repeat the operations of block 614 for one or more frequency bands in the list based on their order, suspending further power measurements as soon as the device processor identifies a power measurement that satisfies the minimum power threshold (see FIG. 8). In some embodiments, power measurements may be taken, in block 614, for each frequency band in the list, in order, until a minimum number greater than one (e.g., two) of frequency bands are identified with power measurements that satisfy (e.g., is greater than or equal to) the minimum power threshold.

In block 616, the device processor may report the power measurement that satisfies the minimum power threshold (e.g., as determined in block 614) to the network of the first subscription. In some embodiments, the device processor may send the power measurement via standard messaging/communications to the first subscription's network. As a result, the first subscription's network may receive the reported power measurement and may determine whether to instruct the first subscription to move to the frequency band associated with the reported power measurement without requiring additional or non-standard messaging or communications, such as an explicit request to switch to a non-interfering frequency band. In other words, the first subscription's network may receive the reported power measurement and may initiate handover procedures without knowing that the reported power measurement is associated with a non-interfering (or lesser-interfering) frequency band.

Thus, in block 618, the device processor may receive instructions from the first subscription's network to move the first subscription to a frequency band identified in the received instructions based on the power measurement reported to the first subscription's network in block 616. As described, because the device processor sent only one power measurement for a non-interfering (or lesser-interfering) frequency band, the device processor may indirectly influence the outcome of the first subscription's network's handover determination, thereby increasing the likelihood that the first subscription's network will determine that the first subscription should move to a non-interfering band in order to receive better service.

In block 620, the device processor may respond to the instructions received in block 618 by configuring the first subscription to initiate a handover operation to the frequency band identified in the instructions received from the first subscriptions network in block 618. Thus, the first subscription may move from an interfering frequency band associated with the coexistence event with the second subscription to the non-interfering frequency band (or a lesser interfering frequency band) associated with the power measurement reported to the first subscription's network in block 616, thereby potentially avoiding the coexistence event and improving the mobile communication device's overall performance. Further, by ordering the frequency bands in the list received from the first subscription's network and taking measurements based on that order until a power measurement is found that satisfies the minimum power threshold, the device processor may reduce the overall number of power measurements that are taken and reported, thereby reducing the power needed to cause the first subscription to move to a non-interfering (or lesser-interfering) frequency band.

After responding to the received instructions in block 620 or after taking and reporting power measurement for the frequency bands in block 622, the device processor may perform the operations of the method 600 in a loop by receiving another list of frequency bands to measure from the first subscription's network in block 604.

FIG. 7A illustrates a method 700 for ordering a list of frequency bands received from a network of a first subscription according to some embodiments. The method 700 may be implemented with a processor (e.g., the general processor 206 of FIG. 2, the baseband modem processor 216, the coexistence management unit 230, a separate controller, and/or the like) of a multi-SIM-multi-active communication device (e.g., the mobile communication device 200 described with reference to FIGS. 2-4). The operations of the method 700 implement some embodiments of the operations performed in blocks 610-612 of the method 600 of FIG. 6. Thus, with reference to FIGS. 1-7A, the device processor may begin performing operations of the method 700 in response to determining that a coexistence event has started or is scheduled to start between the first subscription and the second subscription (i.e., determination block 608 of the method 600="Yes").

In block 702, the device processor may perform a lookup operation in a frequency-band-interference table to identify frequency bands in the list received from the first subscription's network (see block 604 of the method 600) that are associated with coexistence interference involving a frequency band of the second subscription. In some embodiments of the operations performed in block 702, the device processor may perform a lookup operation in a table that includes information regarding the frequency bands that are currently available to the second subscription (e.g., the data table 500). The device processor may then cross reference the second subscription's available frequency bands against each frequency band in the list in a frequency-band-interference table (e.g., the data table 525). Based on these table-lookup operations, the device processor may characterize each of the frequency bands in the list as a non-interfering frequency band or an interfering frequency band.

In some embodiments, the device processor may characterize a frequency band in the list as a non-interfering frequency band in response to determining that the coexistence interference associated with the first frequency band is less than a maximum interference threshold. Similarly, the device processor may characterize a frequency band as an interfering frequency band in response to determining that the coexistence interference associated with the second frequency band satisfies (i.e., is greater than or equal to) the maximum interference threshold.

In block 704, the device processor may order the list of frequency bands from non-interfering frequency bands to interfering frequency bands. Specifically, the device processor may order the list such that power measurements of non-interfering frequency bands occur before power measurements of interfering frequency bands. In some embodiments, the device processor may utilize various tie-breaking algorithms to further order/rank the groups of non-interfering frequency bands and interfering frequency bands. For example, within each of the interfering and non-interfering frequency band groups, the device processor may rank the frequency bands based on one or more criteria, such as historical performance, historical power measurements, user preference, network preference, original equipment manufacturer preference, etc.

In some embodiments, the device processor may not generate an ordered list, but instead generate another data structure, such as an ordered index or adding a ranking value to entries in the list of frequency bands, that enables the device processor to select one or more of the frequency bands for power measurements in order of their predicted levels of interference, as well as other criteria, such as historical performance, historical power measurements, user preference, network preference, original equipment manufacturer preference, etc. For ease of reference, any data structure that may be used by the device processor to select one or more of the frequency bands for power measurements based on predicted levels of interference and/or other criteria is referred to as an "ordered list" even though the data structure may not be a list or a new list.

As a result of ordering the frequency bands in the list, the device processor may take one or more power measurements of the non-interfering (or lesser-interfering) frequencies before taking power measurements of the interfering frequency bands, thereby increasing the likelihood of finding a non-interfering frequency band associated with a power measurement that would provide satisfactory service before needing to take power measurements of interfering frequency bands.

The device processor may continue performing operations in block 614 of the method 600 by taking a power measurement for each of the frequency bands in the ordered list until a power measurement satisfies the minimum power threshold.

Figure 7B:
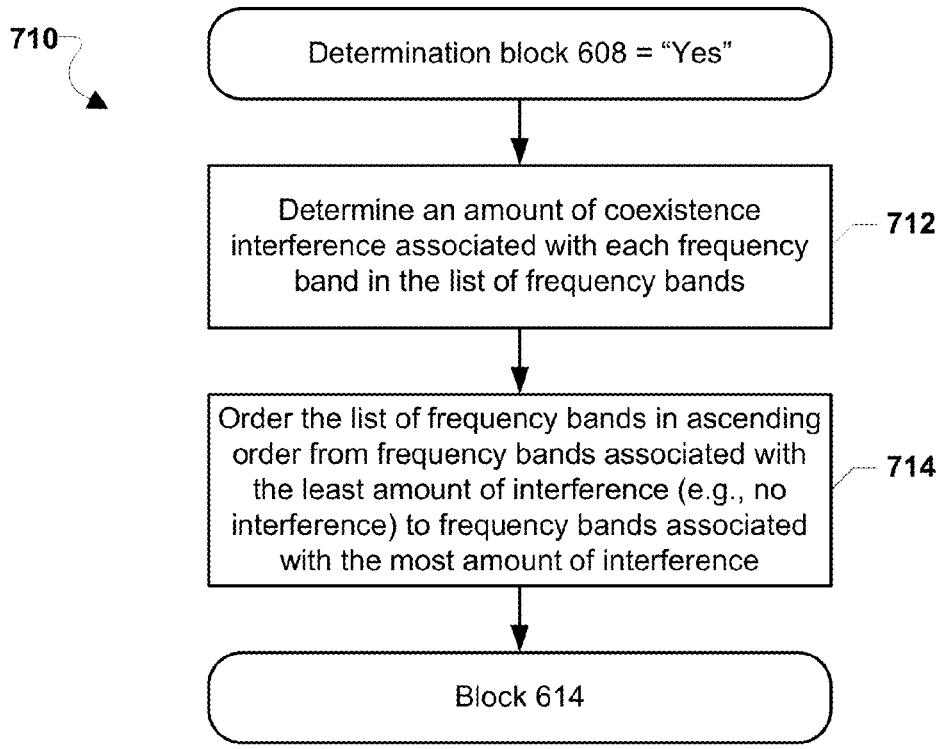
FIG. 7B is a process flow diagram illustrating a method for ordering a list of frequency bands based on an amount of coexistence interference associated with each band in the list according to various embodiments.

FIG. 7B illustrates a method 710 for ordering a list of frequency bands received from a network of a first subscription based on an extent to which each of the frequency bands in the lists is associated with coexistence interference according to some embodiments. The method 710 may be implemented with a processor (e.g., the general processor 206 of FIG. 2, the baseband modem processor 216, the coexistence management unit 230, a separate controller, and/or the like) of a multi-SIM-multi-active communication device (e.g., the mobile communication device 200 described with reference to FIGS. 2-4). The operations of the method 710 implement some embodiments of the operations performed in blocks 610-612 of the method 600 of FIG. 6. Thus, with reference to FIGS. 1-7B, the device processor may begin performing operations of the method 700 in response to determining that a coexistence event has started or is scheduled to start between the first subscription and the second subscription (i.e., determination block 608 of the method 600="Yes").

In block 712, the device processor may determine the extent to which each of the frequency bands in the list received from the first subscription's network is associated with coexistence interference involving a frequency band of the second subscription. In some embodiments of the operations performed in block 712, the device processor may identify one or more frequency bands available to the second subscription (e.g., by referencing the data table 500). In such embodiments, the device processor may perform a look-up operation in a frequency-band-interference table (e.g., the frequency-band-interference table 525) that includes information regarding the extent to which each of the frequency bands in the list de-senses (or is de-sensed by) a frequency band available to the second subscription. For example, the device processor may determine that a frequency band in the list de-senses a frequency band available to the second subscription by a certain amount/degree.

In block 714, the device processor may order the list of frequency bands in ascending order based on the determined amounts of coexistence interference associated with each frequency band in the list. In other words, the device processor may order the list of frequency bands from the frequency band associated with the least amount of interference to the frequency band associated with the greatest amount of interference. By ordering the list of frequency bands based on the determined amounts of coexistence interference, the device processor may take power measurements of frequency bands in the list associated with less interference before taking power measurements of frequency bands in the list associated with greater amounts of interference. As a result, the device processor may have a greater likelihood of finding a power measurement for a non-interfering (or lesser-interfering) frequency band that satisfies the minimum power threshold before expending additional power to take power measurements of interfering frequency bands that may be inaccurate.

In some embodiments, the device processor may utilize various tie-breaking algorithms to further order/rank the groups of non-interfering frequency bands and interfering frequency bands. For example, within each of the interfering and non-interfering frequency band groups, the device processor may rank the frequency bands in the case of a tie in the amount of interference using on one or more additional criteria, such as historical performance, historical power measurements, user preference, network preference, original equipment manufacturer preference, etc. In some embodiments, the ordering of non-interfering frequency bands and interfering frequency bands may be based on factors or criteria in addition to the amount of interference (or interference magnitude). Alternatively, in some embodiments, the ordering or ranking of non-interfering frequency bands and interfering frequency bands may be based on factors or criteria other than interference magnitude.

The device processor may continue performing operations in block 614 of the method 600 by taking a power measurement for each of the frequency bands in the ordered list until a power measurement satisfies the minimum power threshold.

Figure 8:
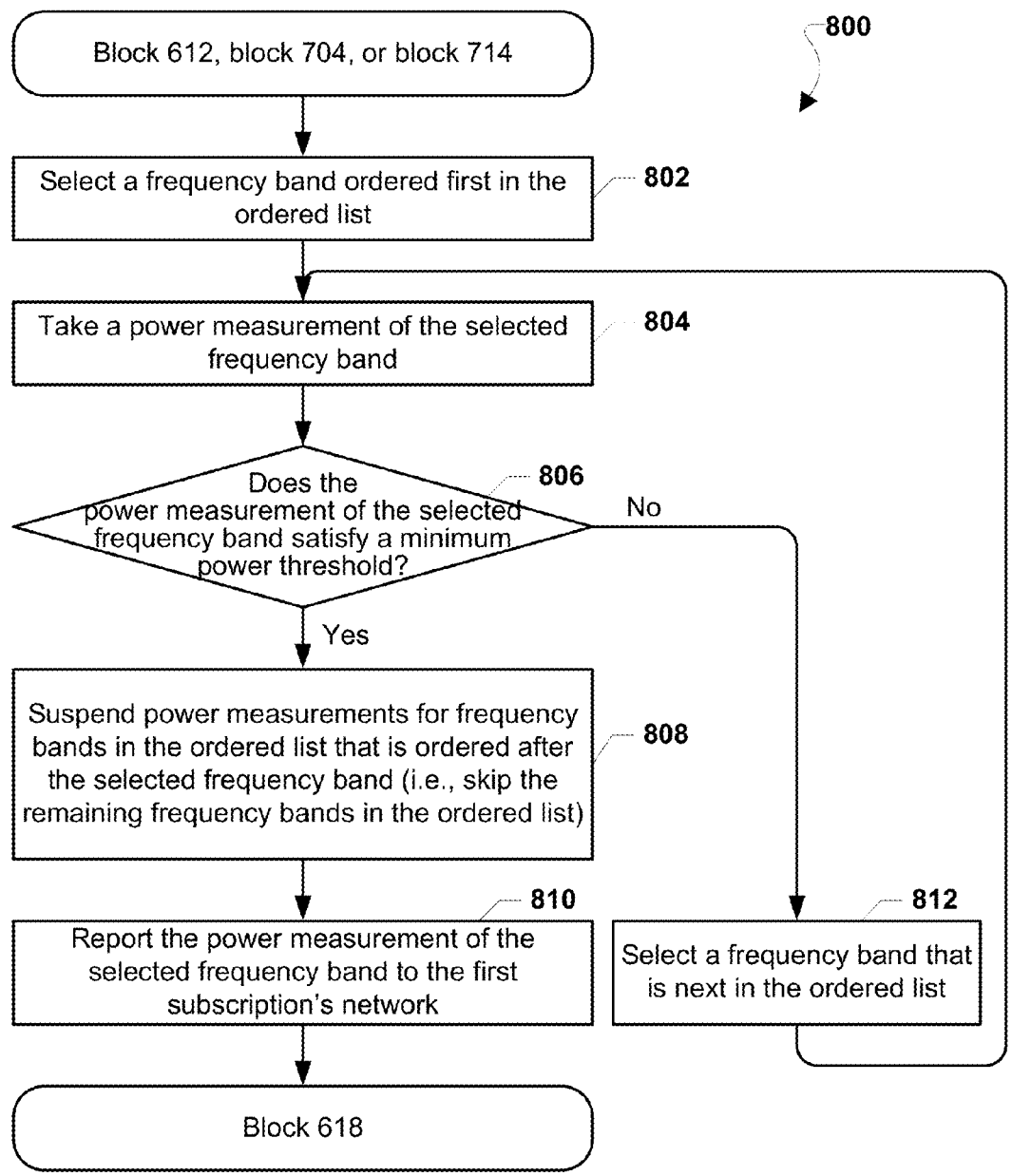
FIG. 8 is a process flow diagram illustrating a method for traversing through an ordered list of frequency bands, in order, to report the first power measurement that satisfies a minimum power threshold according to various embodiments.

FIG. 8 illustrates a method 800 for taking power measurements of frequency bands in an ordered list until a power measurement of one of the frequency bands satisfies a minimum power threshold according to some embodiments. The method 800 may be implemented with a processor (e.g., the general processor 206 of FIG. 2, the baseband modem processor 216, the coexistence management unit 230, a separate controller, and/or the like) of a multi-SIM-multi-active communication device (e.g., the mobile communication device 200 described with reference to FIGS. 2-4). The operations of the method 800 implement some embodiments of the operations performed in blocks 614-616 of the method 600 of FIG. 6. Thus, with reference to FIGS. 1-8, the device processor may begin performing operations of the method 800 after order the list of frequency bands in block 612 of the method 600.

In some embodiments, the device processor may begin performing the operations of the method 800 after ordering the list of frequency bands from non-interfering frequency bands to interfering frequency band (see block 704 of the method 700) or after ordering the list of frequency bands from least to greatest coexistence interference (see block 714 of the method 710).

In block 802, the device processor may select a frequency band listed first in the ordered list (i.e., the first-ordered frequency band). As described, in some embodiments, the list of frequency bands may be ordered such that non-interfering (or mildly interfering) frequency bands are ordered before interfering frequency bands (see, e.g., FIG. 7A). In such embodiments, the device processor may select the first frequency band from the group of non-interfering frequency bands. For example, the device processor may randomly select any non-interfering frequency band in the list or may select a non-interfering frequency band in the list that is ranked highest based on various ranking criteria.

In some embodiments, the list of frequency bands may be selected based on an amount of coexistence interference associated with each frequency band in the list (see, e.g., FIG. 7B). Thus, in such embodiments of the operations performed in block 802, the device processor may select the first-ordered frequency band, which may be associated with the least amount of coexistence interference.

As described, in some embodiments, the device processor may select the first frequency band from the group of non-interfering frequency bands based on predicted coexistence interference without generating an ordered list of frequency bands. For example, the device processor may generate an ordered index of the list of frequency bands that enables the device processor to select the frequency bands for power measurements in order of increasing interference without reordering or generating an ordered list.

In block 804, the device processor may take a power measurement of the selected frequency band, such as by performing known operations. For example, the device processor may take RSRP and/or RSRQ measurements of the selected frequency bands.

In determination block 806, the device processor may determine whether the power measurement of the selected frequency band taken in block 804 satisfies a minimum power threshold. In some embodiments, the minimum power threshold may correspond with a minimum power measurement, which may be a known value, that may have a certain likelihood of providing adequate service. In other words, the device processor may compare frequency bands' power measurements against the minimum power threshold to determine whether the frequency bands will be able to provide a minimum level of service.

In response to determining that the power measurement of the selected frequency band does not satisfy the minimum power threshold (i.e., determination block 806="No"), the device processor may select a frequency band that is next in the ordered list in block 812 (i.e., a next-ordered frequency band). The device processor may repeat the above operations in blocks 804, 806, 812 so long as the power measurement associated with the currently selected frequency band does not satisfy the minimum power threshold. In other words, the device processor may traverse the ordered list, taking a power measurement for each frequency band in the list based on the frequency band's order in the list until a power measurement for a frequency band satisfies the minimum power threshold.

In response to determining that the power measurement of the selected frequency band satisfies the minimum power threshold (i.e., determination block 806="Yes"), the device processor may suspend power measurements of any frequency band in the list that is ordered after the selected frequency band in block 808. In other words, to save power, the device processor may not take power measurements of any frequency band that has not already been measured because the selected frequency band's power measurement is anticipated to provide adequate service (i.e., satisfies the minimum power threshold). Thus, in light of the expected service of the selected frequency band, taking additional power measurements may be unnecessary.

In block 810, the device processor may report the power measurement of the selected frequency band to the first subscription's network. In some embodiments, as described, reporting the power measurement of the selected frequency band may cause the first subscription's network to send instructions to the device processor to perform a handover operation to the selected frequency band. Thus, the device processor may continue performing the operations in block 618 of the method 600 by receiving the instructions from the first subscription's network to move the first subscription to the selected frequency band.

Figure 9:
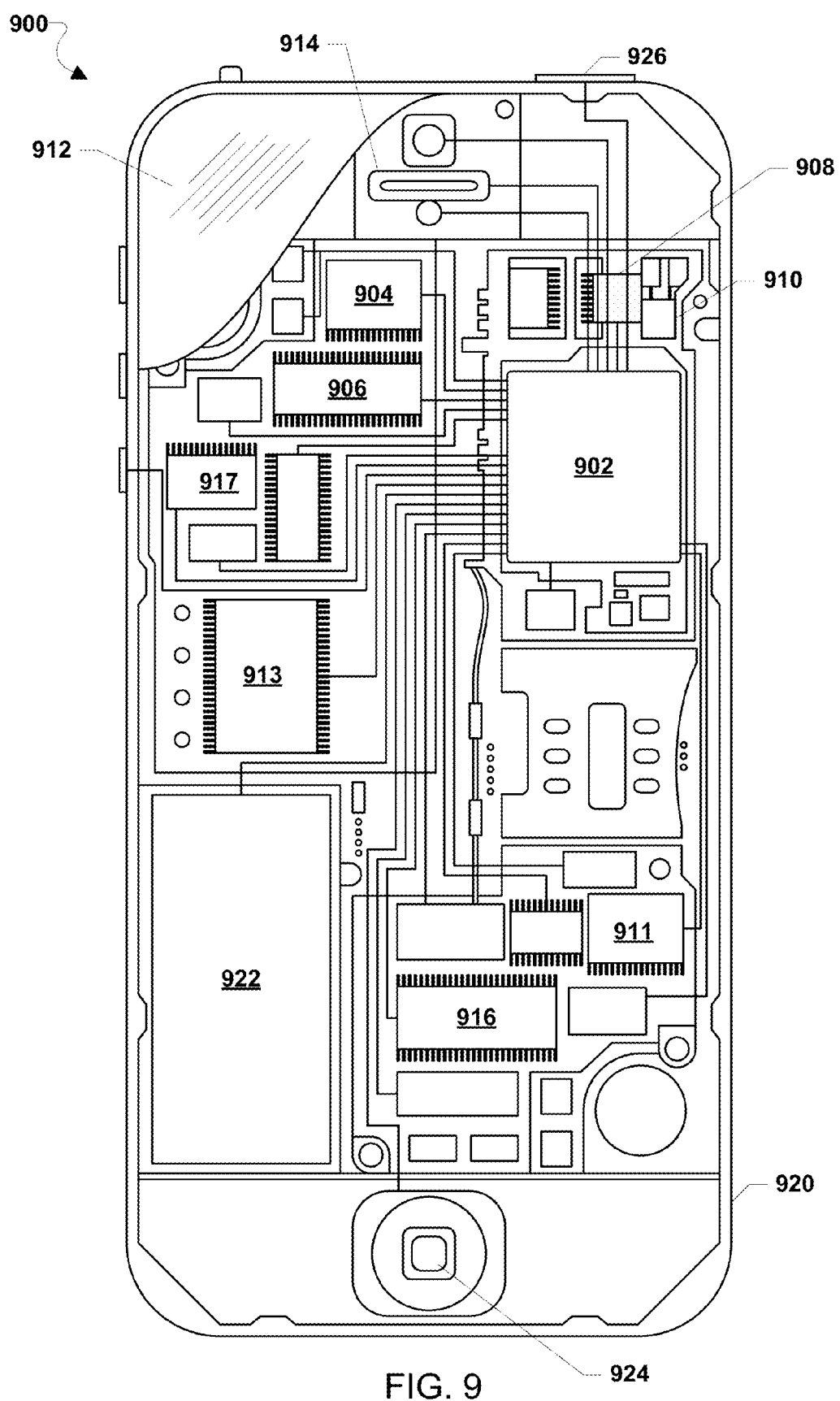
FIG. 9 is a component block diagram of a multi-SIM-multi-active communication device suitable for implementing some embodiment methods.

Various embodiments may be implemented in any of a variety of mobile communication devices, an example on which (e.g., mobile communication device 900) is illustrated in FIG. 9. According to various embodiments, the mobile communication device 900 may be similar to the mobile communication devices 110, 120, 200 as described above with reference to FIGS. 1-4. As such, the mobile communication device 900 may implement the methods 600, 700, 710, 800 in FIGS. 6-8.

Thus, with reference to FIGS. 1-9, the mobile communication device 900 may include a processor 902 coupled to a touchscreen controller 904 and an internal memory 906. The processor 902 may be one or more multi-core integrated circuits designated for general or specific processing tasks. The internal memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the mobile communication device 900 need not have touch screen capability.

The mobile communication device 900 may have one or more cellular network transceivers 908, 916 coupled to the processor 902 and to two or more antennae 910, 911 and configured for sending and receiving cellular communications. The transceivers 908, 916 and the antennae 910, 911 may be used with the above-mentioned circuitry to implement the various embodiment methods. The mobile communication device 900 may include one or more SIM cards (e.g., SIM 913) coupled to the transceivers 908, 916 and/or the processor 902 and configured as described above. The mobile communication device 900 may include a cellular network wireless modem chip 917 that enables communication via a cellular network and is coupled to the processor 902.

The mobile communication device 900 may also include speakers 914 for providing audio outputs. The mobile communication device 900 may also include a housing 920, constructed of a plastic, metal, or a combination of materials, for containing all or some of the components discussed herein. The mobile communication device 900 may include a power source 922 coupled to the processor 902, such as a disposable or rechargeable battery. The rechargeable battery may also be coupled to the peripheral device connection port to receive a charging current from a source external to the mobile communication device 900. The mobile communication device 900 may also include a physical button 924 for receiving user inputs. The mobile communication device 900 may also include a power button 926 for turning the mobile communication device 900 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method implemented on a multi-subscription mobile communication device for avoiding a coexistence event between a first subscription and a second subscription, comprising:
   determining an amount of interference that frequency bands in a list of frequency bands available to the first subscription would impose on frequency bands used by the second subscription;
   ordering the list of frequency bands in order of increasing interference with frequency bands used by the second subscription;
   taking power measurements of frequency bands in the ordered list in order;
   determining whether a power measurement for a frequency band satisfies a minimum power threshold; and
   in response to determining that a power measurement for a frequency band satisfies the minimum power threshold:
      suspending further power measurements of remaining frequency bands in the ordered list; and
      reporting the power measurement that satisfies the minimum power threshold to a network of the first subscription.

2. The method of claim 1, wherein determining an amount of interference that frequency bands in a list of frequency bands available to the first subscription would impose on frequency bands used by the second subscription comprises determining an amount of coexistence interference that each frequency band in the list of frequency bands would impose on a frequency band used by the second subscription.

3. The method of claim 1, further comprising identifying frequency bands in the list of frequency bands available to the first subscription that will interfere ("interfering frequency bands") with frequency bands used by the second subscription by an amount of coexistence interference that equals or exceeds a maximum interference threshold.

4. The method of claim 3, further comprising:
   identifying frequency bands in the list of frequency bands available to the first subscription that will not interfere ("non-interfering frequency bands") with frequency bands used by the second subscription,
   wherein ordering the list of frequency bands in order of increasing interference with frequency bands used by the second subscription comprises ordering the list of frequency bands such that non-interfering frequency bands are ordered before interfering frequency bands.

5. The method of claim 1, further comprising performing a handover operation in the first subscription to the frequency band that satisfies the minimum power threshold in response to instructions received from the network of the first subscription.

6. The method of claim 1, further comprising receiving the list of frequency bands available to the first subscription from the network of the first subscription.

7. The method of claim 1, wherein ordering the list of frequency bands in order of increasing interference with frequency bands used by the second subscription comprises generating an ordered index of the list of frequency bands.

8. The method of claim 1, wherein ordering the list of frequency bands in order of increasing interference with frequency bands used by the second subscription comprises adding a ranking value to entries in the list of frequency bands.

9. The method of claim 1, further comprising monitoring for a coexistence event between the first subscription and the second subscription, wherein operations of the method of claim 1 are performed in response to detecting that a coexistence event has started or is scheduled to start.

10. A multi-subscription mobile communication device, comprising:
   a first wireless transceiver;
   a second wireless transceiver; and
   a processor coupled to the first and second wireless transceivers and configured with processor-executable instructions to:
      determine an amount of interference that frequency bands in a list of frequency bands available to a first subscription would impose on frequency bands used by a second subscription;
      order the list of frequency bands in order of increasing interference with frequency bands used by the second subscription;
      take power measurements of frequency bands in the ordered list in order;
      determine whether a power measurement for a frequency band satisfies a minimum power threshold; and
      in response to determining that a power measurement for a frequency band satisfies the minimum power threshold:
         suspend further power measurements of remaining frequency bands in the ordered list; and
         report the power measurement that satisfies the minimum power threshold to a first network communicating with the first wireless transceiver.

11. The multi-subscription mobile communication device of claim 10, wherein the processor is further configured with processor-executable instructions to determine the amount of interference that frequency bands in a list of frequency bands available to the first subscription would impose on frequency bands used by the second subscription based on an amount of coexistence interference that each frequency band in the list of frequency bands would impose on a frequency band used by the second subscription.

12. The multi-subscription mobile communication device of claim 10, wherein the processor is further configured with processor-executable instructions to identify frequency bands in the list of frequency bands available to the first subscription that will interfere ("interfering frequency bands") with frequency bands used by the second subscription by an amount of coexistence interference that equals or exceeds a maximum interference threshold.

13. The multi-subscription mobile communication device of claim 12, wherein the processor is further configured with processor-executable instructions to:
   identify frequency bands in the list of frequency bands available to the first subscription that will not interfere ("non-interfering frequency bands") with frequency bands used by the second subscription; and
   order the list of frequency bands in order of increasing interference with frequency bands used by the second subscription such that non-interfering frequency bands are ordered before interfering frequency bands.

14. The multi-subscription communication device of claim 10, wherein the processor is further configured with processor-executable instructions to perform a handover operation in the first subscription to the frequency band that satisfies the minimum power threshold in response to instructions received from the first network of the first subscription.

15. The multi-subscription mobile communication device of claim 10, wherein the processor is further configured with processor-executable instructions to receive the list of frequency bands from the first network of the first subscription.

16. The multi-subscription mobile communication device of claim 10, wherein the processor is further configured with processor-executable instructions to order the list of frequency bands in order of increasing interference with frequency bands used by the second subscription by generating an ordered index of the list of frequency bands.

17. The multi-subscription mobile communication device of claim 10, wherein the processor is further configured with processor-executable instructions to order the list of frequency bands in order of increasing interference with frequency bands used by the second subscription by adding a ranking value to entries in the list of frequency bands.

18. The multi-subscription mobile communication device of claim 10, wherein the processor is further configured with processor-executable instructions to:
    monitor for a coexistence event between the first subscription and the second subscription; and
    perform operations of claim 10 in response to detecting that a coexistence event has started or is scheduled to start.

19. A multi-subscription mobile communication device, comprising:
    means for determining an amount of interference that frequency bands in a list of frequency bands available to a first subscription would impose on frequency bands used by a second subscription;
    means for taking power measurements of frequency bands in the list of frequency bands in order of increasing interference with frequency bands used by the second subscription;
    means for determining whether a power measurement for a frequency band satisfies a minimum power threshold;
    means for suspending further power measurements of remaining frequency bands in response to determining that a power measurement for a frequency band satisfies the minimum power threshold; and
    means for reporting the power measurement that satisfies the minimum power threshold to a network of a first subscription.

20. A method implemented on a multi-subscription mobile communication device for avoiding a coexistence event between a first subscription and a second subscription, comprising:
    identifying frequency bands in a list of frequency bands available to the first subscription that will not interfere ("non-interfering frequency bands") with frequency bands used by the second subscription;
    taking power measurements of non-interfering frequency bands until a power measurement of a non-interfering frequency band satisfies a minimum power threshold;
    suspending further power measurements of remaining non-interfering frequency bands in response to determining that a power measurement for a non-interfering frequency band that satisfies the minimum power threshold; and
    reporting the power measurement that satisfies the minimum power threshold to a network of the first subscription.

21. The method of claim 20, wherein non-interfering frequency bands are frequency bands that do not exhibit coexistence interference with a frequency band of the second subscription.

22. The method of claim 20, further comprising performing a handover operation in the first subscription to the frequency band that satisfies the minimum power threshold in response to instructions received from the network of the first subscription.

23. The method of claim 20, further comprising receiving the list of frequency bands from the network of the first subscription.

24. The method of claim 20, further comprising monitoring for a coexistence event between the first subscription and the second subscription, wherein operations of the method of claim 20 are performed in response to detecting that a coexistence event has started or is scheduled to start.

25. The method of claim 20, further comprising:
    in response to taking power measurements of all identified non-interfering frequency bands without determining that a power measurement for a frequency band satisfies the minimum power threshold, the method further comprising:
        determining an amount of coexistence interference associated with frequency bands in the list of frequency bands available to the first subscription that will interfere ("interfering frequency bands") with frequency bands used by the second subscription;
        taking power measurements of the interfering frequency bands in order of coexistence interference based on the determined amounts of coexistence interference; and
        in response to determining that a power measurement for an interfering frequency band satisfies the minimum power threshold:
            suspending further power measurements of remaining interfering frequency bands; and
            reporting the power measurement that satisfies the minimum power threshold to the network of the first subscription.

26. The method of claim 25, wherein interfering frequency bands are frequency bands that exhibit an amount of coexistence interference with a frequency band of the second subscription that equals or exceeds a maximum interference threshold.

27. The method of claim 25, further comprising performing a handover operation in the first subscription to the frequency band that satisfies the minimum power threshold in response to instructions received from the network of the first subscription.

28. The method of claim 25, further comprising monitoring for a coexistence event between the first subscription and the second subscription, wherein operations of the method of claim 25 are performed in response to detecting that a coexistence event has started or is scheduled to start.

* * * * *